(12) United States Patent
Surowka

(10) Patent No.: US 10,648,751 B1
(45) Date of Patent: May 12, 2020

(54) HEAT DISSIPATING CLADDING

(71) Applicant: Rockwell Automation Technologies, Inc., Mayfield Heights, OH (US)

(72) Inventor: Piotr Surowka, Katowice (PL)

(73) Assignee: Rockwell Automation Technologies, Inc, Mayfield Heights, OH (US)

( * ) Notice: Subject to any disclaimer, the term of this patent is extended or adjusted under 35 U.S.C. 154(b) by 0 days.

(21) Appl. No.: 16/671,031

(22) Filed: Oct. 31, 2019

(51) Int. Cl.
*H02G 5/10* (2006.01)
*F28F 13/18* (2006.01)

(52) U.S. Cl.
CPC ............. *F28F 13/185* (2013.01); *H02G 5/10* (2013.01); *F28F 2260/00* (2013.01)

(58) Field of Classification Search
CPC ....... F28F 13/185; F28F 2260/00; H02G 5/10
USPC ........................................ 174/70 B
See application file for complete search history.

(56) References Cited

U.S. PATENT DOCUMENTS

| | | | | |
|---|---|---|---|---|
| 3,930,113 A | * | 12/1975 | Johansen | ................. H01B 5/10 174/40 R |
| 8,780,559 B2 | * | 7/2014 | Weaver, Jr. | ........... H01L 23/427 165/104.21 |
| 8,983,019 B2 | * | 3/2015 | Varanasi | ............... F28F 13/182 376/424 |
| 2003/0104170 A1 | * | 6/2003 | Johnston | ........... A61F 13/53708 428/167 |
| 2011/0198059 A1 | * | 8/2011 | Gavillet | ................ F28D 15/046 165/104.26 |
| 2016/0211425 A1 | * | 7/2016 | Tsujimoto | ............... H01L 33/22 |

* cited by examiner

*Primary Examiner* — Timothy J Thompson
*Assistant Examiner* — Michael F McAllister
(74) *Attorney, Agent, or Firm* — Kunzler Bean & Adamson

(57) ABSTRACT

For dissipating heat a cladding includes a dissipation tape and a particle coating. The dissipation tape includes dissipation ridges that dissipate infrared radiation at a dissipation angle. The particle coating is deposited on the dissipation tape.

20 Claims, 6 Drawing Sheets

HEAT DISSIPATING CLADDING

BACKGROUND INFORMATION

The subject matter disclosed herein relates to a heat dissipating cladding.

BRIEF DESCRIPTION

A cladding for dissipating heat is disclosed. The cladding includes a dissipation tape and a particle coating. The dissipation tape comprises dissipation ridges that dissipate infrared radiation at a dissipation angle. The particle coating is deposited on the dissipation tape.

A system for dissipating heat is also disclosed. The system includes a busbar, dissipation tape, and a particle coating. The dissipation tape is disposed on the busbar and comprises dissipation ridges that dissipate infrared radiation at a dissipation angle. The particle coating is deposited on the dissipation tape.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

The description of elements in each figure may refer to elements of proceeding figures. Like numbers refer to like elements in all figures, including alternate embodiments of like elements.

Figure 1:
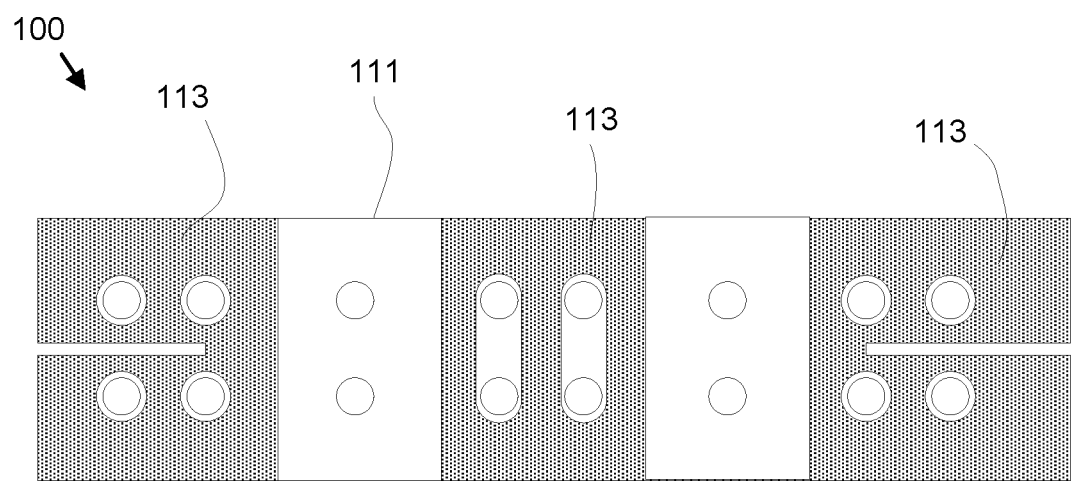
FIG. 1 is a front view schematic drawing of busbar system according to an embodiment.

FIG. 1 is a front view schematic drawing of busbar system 100. The busbar system 100 may distribute electrical power within an equipment cabinet. In the depicted embodiment, the busbar system 100 includes a busbar 111 and cladding 113 disposed on the busbar 111. The busbar 111 may distribute high current electrical power. As a result, the busbar 111 may generate significant heat. The heat may degrade the performance of the busbar 111.

The embodiments provide cladding 113 that enhances heat dissipation from the busbar 111. The cladding 113 includes dissipation tape that dissipates infrared radiation at a dissipation angle to enhance the infrared radiation dissipation. In addition, the cladding 113 may include a particle coating deposited on the dissipation tape as will be described hereafter. As a result, an operating temperature of the busbar 111 may be reduced and the efficiency and safety of the busbar 111 may be enhanced.

The cladding 113 and/or dissipation tape 101 may be applied to one side of the busbar 111. In addition, the cladding 113 and/or dissipation tape 101 may be applied to two sides of the busbar 111. In a certain embodiment, the cladding 113 and/or dissipation tape 101 is applied to each surface of the busbar 111.

Figure 2A:
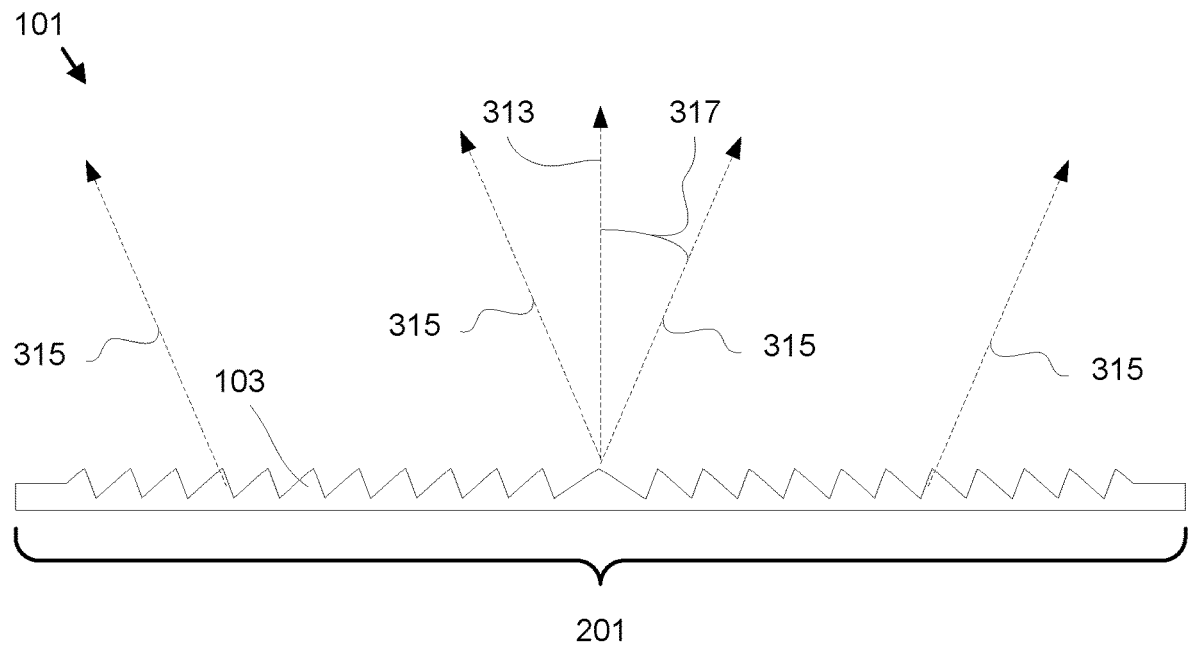
FIG. 2A is a side view drawing of dissipation tape according to an embodiment.

FIG. 2A is a side view drawing of the dissipation tape 101. In the depicted embodiment, the dissipation tape 101 comprises dissipation ridges 103 that dissipate the infrared radiation 315 at a dissipation angle 317. The dissipation angle 317 may be measured from a normal axis 313 for the dissipation tape 101. The dissipation angle 317 may be in the range of 5 to 35 degrees from the normal axis 313 for the dissipation tape 101. In a certain embodiment, the dissipation angle 317 is a minimum dissipation angle 317. For example, the dissipation angle 317 may increase from a center of the dissipation tape 101 towards an edge of the dissipation tape 101. In an alternate example, the dissipation angle 317 may increase from the edge of the dissipation tape 101 to the center of the dissipation tape 101.

By dissipating the infrared radiation at the dissipation angle 317, heat may be more efficiently radiated from the busbar 111. For example, the dissipation angle 317 may direct the infrared radiation to a volume that more efficiently removes heat such as an area of air flow.

The dissipation ridges 103 may be formed longitudinally along the dissipation tape 101. In one embodiment, the dissipation ridges 103 form a fresnel pattern. The dissipation tape 101 may have an infrared emissivity in the wavelength spectrum of 8 to 14 micrometers (μm). In a certain embodiment, the dissipation ridges 103 have a thermal conductivity in the range of 5 to 20 degrees Celsius/Watt (° C./W).

Figure 2B:
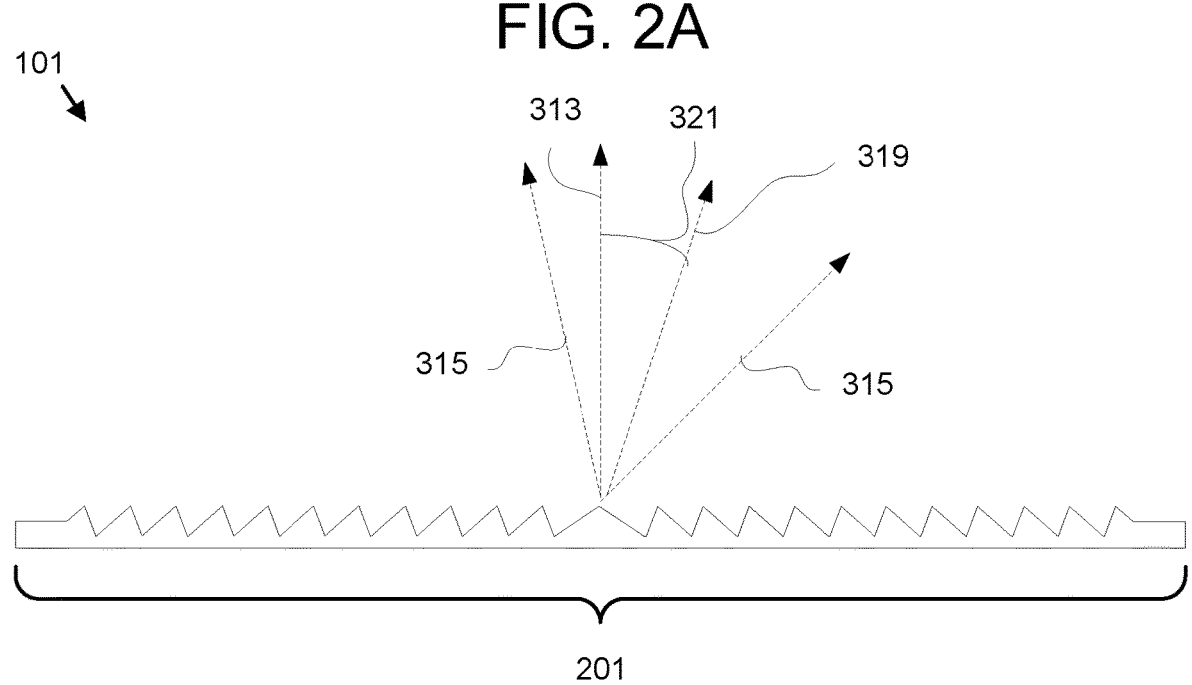
FIG. 2B is a side view drawing of dissipation tape according to an alternate embodiment.

FIG. 2B is a side view drawing of the dissipation tape 101. In the depicted embodiment, the dissipation tape 101 dissipates infrared radiation 315 at a dissipation vector 319 from the normal axis 313 for the dissipation table 101. The dissipation vector 319 may be an average of the vectors of infrared radiation 315 dissipating from the dissipation tape 110. As a result, the dissipation tape 101 may direct infrared radiation 315 at an average angle 321 from the normal axis 313.

Figure 2C:
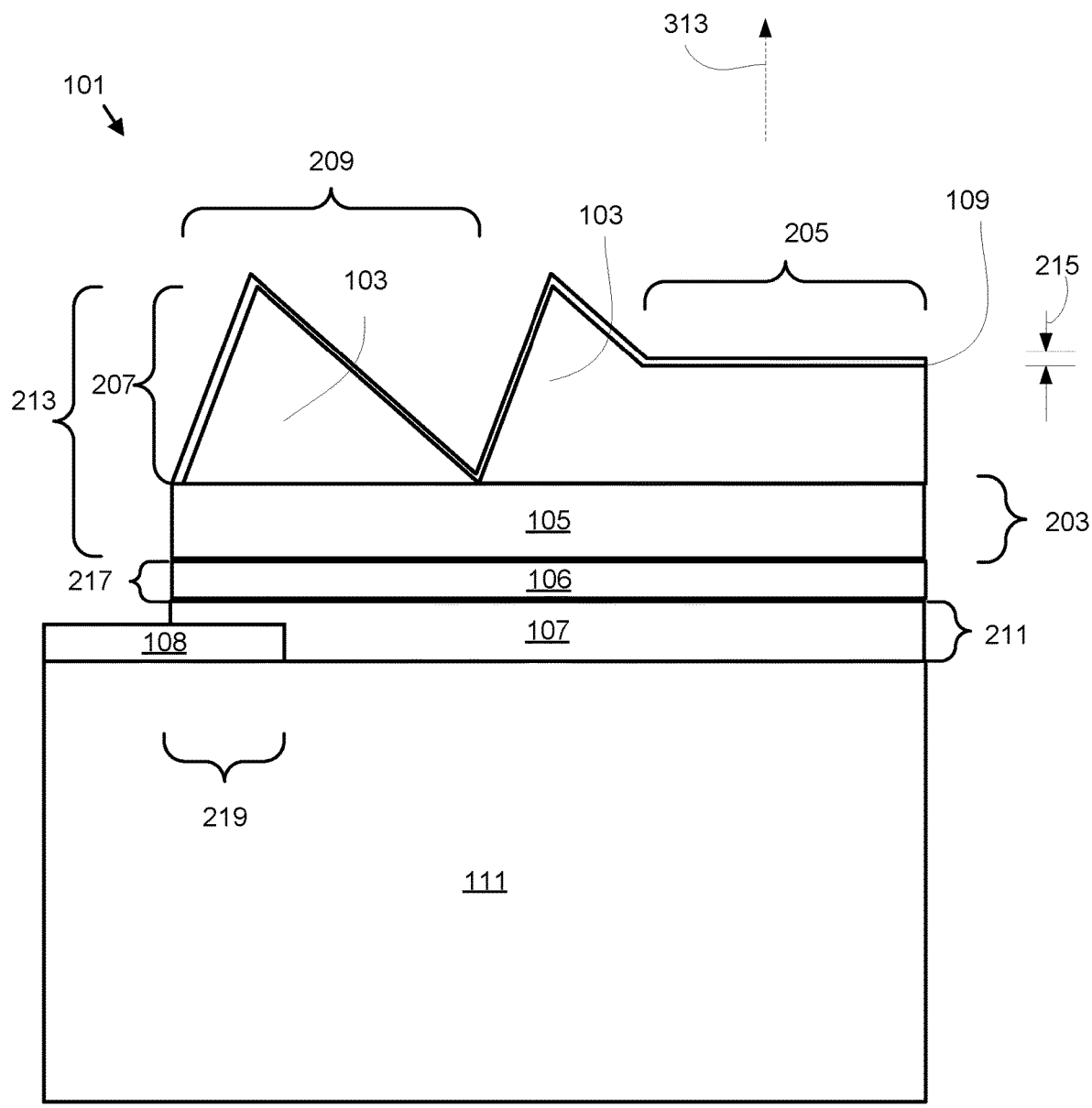
FIG. 2C is a side view cross section schematic drawing of dissipation tape according to an embodiment.

FIG. 2C is a side view cross-section schematic drawing of the dissipation tape 101. In the depicted embodiment, the dissipation tape 101 is disposed on the busbar 111 and includes an adhesive material 107, a foil base 106, a base 105, and the dissipation ridges 103. In one embodiment, the dissipation tape 101 includes a thermal coating 109.

In a certain embodiment, the cladding 113 includes a nano-paint layer 108 deposited on the busbar 111. The nano paint layer 108 may not be deposited on the busbar 111 under all of the dissipation tape 101. Only an overlap distance 219 of the nano paint layer 108 may be disposed between the cladding 113 and/or dissipation tape 101 and the busbar 111. The overlap distance 219 may be in the range of 50 to 500 millimeters (mm).

The adhesive material 107 may have an adhesive thickness 211. The adhesive thickness 211 may be in the range of 25 to 100 μm. In one embodiment, the adhesive thickness 211 is 60 μm. The adhesive material 107 may be selected from the group consisting of acrylic adhesives and silicone adhesives. If the foil base 106 is a polyimide film, the adhesive material 107 may not be included.

The foil base 106 may be selected from the group consisting of a polyimide film, an aluminum foil, and a copper foil. The polyimide film may be Kapton®. The foil base 106 may have a foil thickness 217 in the range of 25 to 100 μm. For polyimide film, the foil thickness 217 may be in the range of 15 to 35 μm. In one embodiment, the foil thickness 217 for polyimide film is 25 μm. For aluminum foil, the foil thickness 217 may be in the range of 80 to 120 μm. In a certain embodiment, the foil thickness 217 for aluminum foil is 100 μm. For copper foil, the foil thickness 217 may be in the range of 80 to 120 μm. In a certain embodiment, the foil thickness 217 for copper foil is 100 μm. An aluminum foil base 106 may be used with aluminum bus bars 111. A copper foil base 106 may be used with copper bus bars 111.

The polyimide film may be punched, such as with a cold hammer. In one embodiment, the aluminum foil and/or copper foil is skived. The aluminum foil and/or copper foil may be laser grooved.

The dissipation ridges 103 may be formed with the base 105. A base ridge height 213 may be in the range of 80 to 150 μm. In one embodiment, the base ridge height 213 is 115 μm. A base height 203 may be in the range of 50 to 90 μm. The dissipation ridges 103 and base 105 may be metallic. The dissipation ridges 103 may have a ridge height 207 in the range of 30-60 μm and a ridge width 209 in the range of 50-90 μm.

In one embodiment, the dissipation ridges 103 may include a tape boundary 205. The tape boundary 205 may be in the range of 5 to 500 mm. The tape boundary 205 may be perpendicular to the normal axis 313. Alternatively, the tape boundary 205 may be sloped.

In one embodiment, the dissipation ridges 103 have a thermal coating 109. The thermal coating 109 may have a coating thickness 215 in the range of 4 to 10 μm. The thermal coating 109 may be black.

Figure 2D:
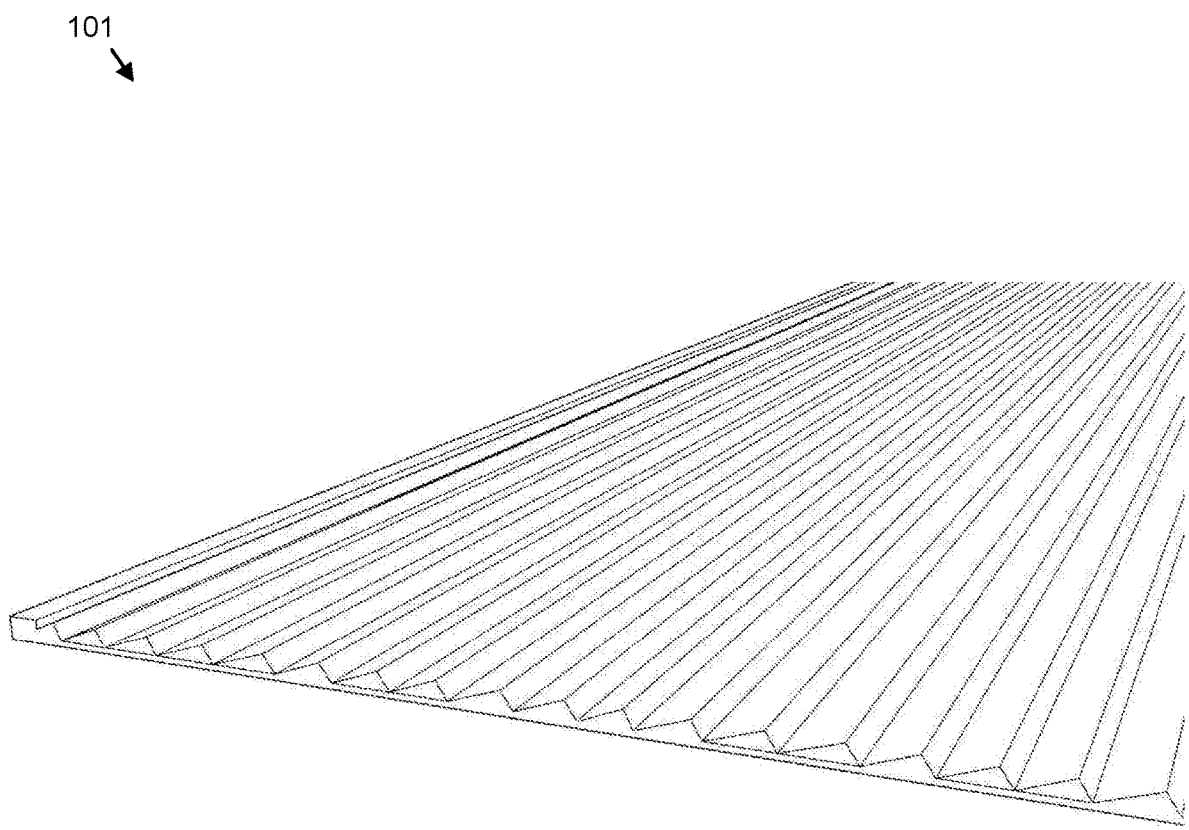
FIG. 2D is a perspective drawing of the dissipation tape according to an embodiment.

FIG. 2D is a perspective drawing of the dissipation tape 101. The dissipation tape 101 may be formed as a continuous segment. The dissipation tape 101 may be cut and applied to the busbar 111 to form the cladding 113.

Figure 3A:
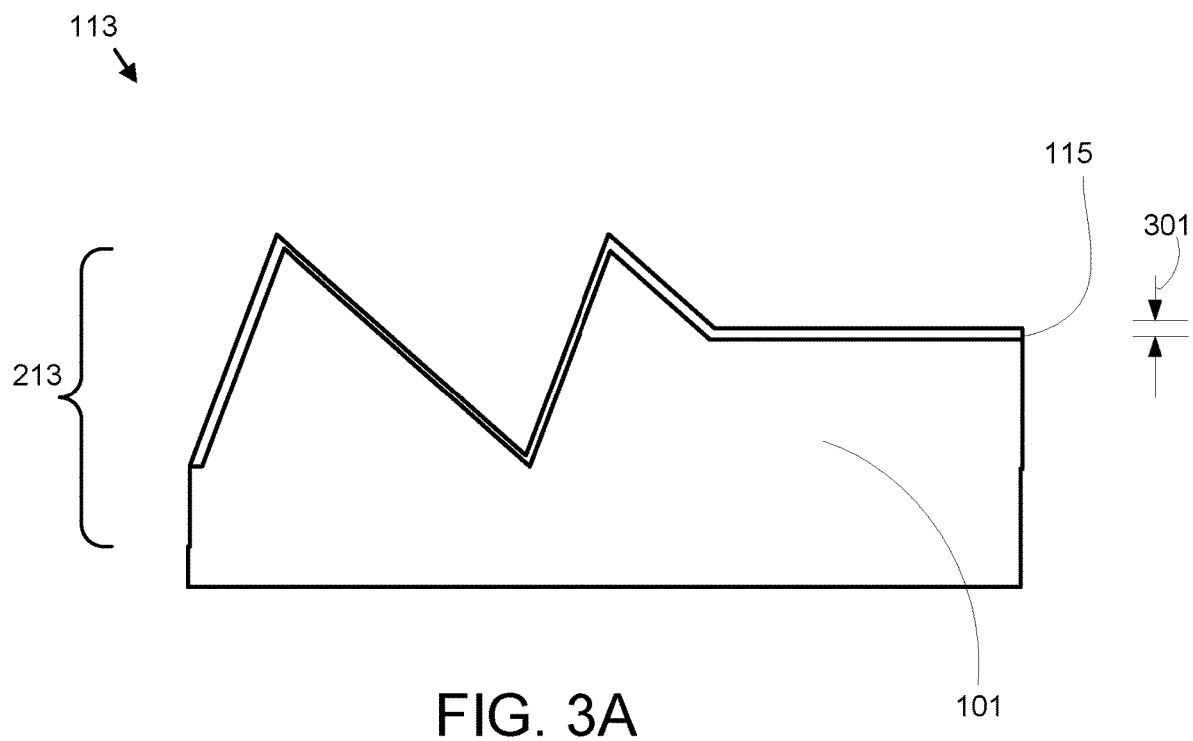
FIG. 3A is a side view schematic drawing of dissipation tape with the particle coating according to an embodiment.

FIG. 3A is a side view schematic drawing of dissipation tape 101. In the depicted embodiment, the particle coating 115 is shown deposited on the dissipation tape 101. In one embodiment, the particle coating 115 comprises particles. The particles may be 50-70 percent by mass of silver and 30-50 percent by mass of copper, zinc, zinc oxide, gold, nickel, palladium, and/or aluminum. The particle coating 115 may be sintered to the dissipation tape 101. In one embodiment, the particle coating 115 is sintered at a temperature in the range of 80 to 120 degrees C. for a time in the range of 2 to 20 seconds.

Figure 3B:
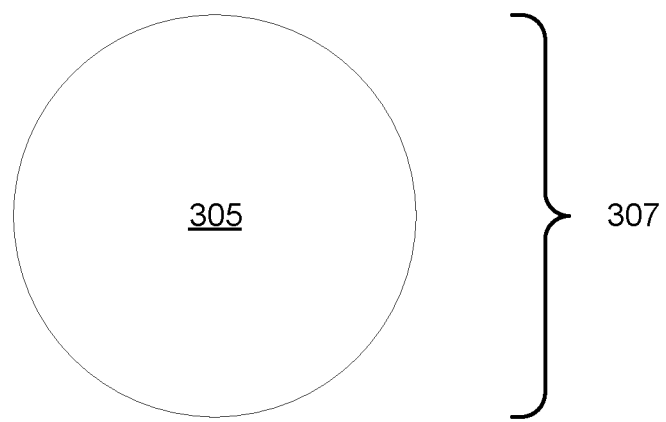
FIG. 3B is a side view schematic drawing of a particle according to an embodiment.

FIG. 3B is a side view schematic drawing of a particle 305 of the particle coating 115. The particle 305 may have a particle dimension 307 in the range of 100 to 2500 nanometers (nm).

Problem/Solution

A busbar 111 may carry significant current. As a result, the resistance of the busbar 111 may generate substantial heat. The heat must be dissipated from the busbar 111 to avoid damage to the busbar 111 and to improve the efficiency of the busbar 111 in distributing electrical power.

The embodiments described herein include a cladding 113 with a dissipation tape 101 and a particle coating 115 deposited on the dissipation tape 101. The dissipation tape 101 may comprise dissipation ridges 103 that dissipate infrared radiation 315 at a dissipation angle 317. The dissipation angle 317 may be selected to dissipate the infrared radiation 315 more efficiently from the busbar 111. In addition, the dissipation tape 101 may include a particle coating 115 deposited on the dissipation tape 101. The particle coating 115 may further improve the efficiency of the cladding 113 in dissipating heat from the busbar 111.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cladding comprising:
   a dissipation tape comprising dissipation ridges that dissipate infrared radiation at a dissipation angle; and
   a particle coating deposited on the dissipation tape.

2. The cladding of claim 1, wherein the dissipation tape has an infrared emissivity in the wavelength spectrum of 8 to 14 micrometers (μm).

3. The cladding of claim 1, wherein the dissipation angle is in the range of 5 to 35 degrees from a normal axis for the dissipation tape.

4. The cladding of claim 1, wherein the dissipation tape dissipates infrared radiation at a dissipation vector from a normal axis for the dissipation tape.

5. The cladding of claim 1, wherein the dissipation ridges form a fresnel pattern.

6. The cladding of claim 1, wherein the dissipation ridges have a ridge height in the range of 30-60 μm and a ridge width in the range of 50-90 μm.

7. The cladding of claim 6, wherein the dissipation ridges have a thermal conductivity in the range of 5 to 20 degrees Celsius/Watt (° C./W).

8. The cladding of claim 6, wherein the dissipation ridges are formed with a base and a base ridge height is in the range of 80 to 150 μm.

9. The cladding of claim 8, wherein the dissipation ridges and base are metallic.

10. The cladding of claim 1, the cladding further comprising a foil base, where the foil base is selected from the group consisting of polyimide film, aluminum foil, and copper foil.

11. The cladding of claim 10, wherein the foil base has a foil thickness in the range of 25 to 100 µm.

12. The cladding of claim 1, the cladding further comprising a nano-paint layer deposited on a busbar, wherein an overlap distance of the nano-paint layer is disposed between the cladding and the busbar.

13. The cladding of claim 1, wherein the dissipation ridges have a thermal coating with a coating thickness in the range of 4 to 10 µm.

14. The cladding of claim 13, wherein the thermal coating is black.

15. The cladding of claim 1, wherein the dissipation tape comprises an adhesive material with an adhesive thickness in the range of 25 to 100 µm.

16. The cladding of claim 1, wherein the particle coating comprises particles with a particle dimension in the range of 100 to 2500 nanometers (nm).

17. The cladding of claim 1, wherein the particle coating comprises particles of 50-70 percent by mass of silver and 30-50 percent by mass of copper, zinc, zinc oxide, gold, nickel, palladium, and/or aluminum.

18. The cladding of claim 1, wherein the particle coating is sintered at a temperature in the range of 80 to 120 degrees C. for a time in the range of 2 to 20 seconds.

19. A system comprising:
a busbar;
a dissipation tape disposed on the busbar and comprising dissipation ridges that dissipate infrared radiation at a dissipation angle; and
a particle coating deposited on the dissipating tape.

20. The system of claim 18, wherein the dissipation tape is applied to two sides of the busbar.

* * * * *